United States Patent [19]
Karathanos

[11] Patent Number: 5,330,107
[45] Date of Patent: Jul. 19, 1994

[54] DRIP IRRIGATION EMITTER EMBODIED IN A WATER CONDUIT PRESSURE COMPENSATING WITH SELF-REGULATION

[75] Inventor: George Karathanos, Attikis, Greece
[73] Assignee: Eurodrip S.A., Attikis, Greece
[21] Appl. No.: 39,152
[22] PCT Filed: Jul. 28, 1992
[86] PCT No.: PCT/GR92/00013
§ 371 Date: Mar. 29, 1993
§ 102(e) Date: Mar. 29, 1993
[87] PCT Pub. No.: WO93/02547
PCT Pub. Date: Feb. 18, 1993

[30] Foreign Application Priority Data
Aug. 1, 1991 [GR] Greece .............................. 910100334

[51] Int. Cl.⁵ .............................................. B05B 1/30
[52] U.S. Cl. .................................. 239/533.1; 239/542; 138/43
[58] Field of Search ................. 239/533.1, 533.13, 542, 239/547; 138/42, 43

[56] References Cited

U.S. PATENT DOCUMENTS

| | | | |
|---|---|---|---|
| 3,815,636 | 6/1974 | Menzel | 138/43 X |
| 4,254,791 | 3/1981 | Bron | 239/533.13 X |
| 4,715,543 | 12/1987 | Rinkewich | 239/542 |
| 4,824,025 | 4/1989 | Miller | 239/542 |
| 4,856,552 | 8/1989 | Hiemstra | 239/542 X |
| 4,971,253 | 11/1990 | Lazarus | 239/533.1 |
| 5,111,996 | 5/1992 | Eckstein | 239/542 |
| 5,236,130 | 8/1993 | Hadar | 239/542 |

*Primary Examiner*—Andres Kashnikow
*Assistant Examiner*—Lesley D. Morris

[57] ABSTRACT

One piece, in-line, water pressure compensating with self-regulation emitter, consisting of one regulator cylinder permanently embodied inside a water conduit on which conduit holes have been opened, at the point where the emitter is embodied, so that the water drips out onto the soil. The emitter self-regulates to provide a constant emission of water. This self-regulation is accomplished by a flexible part of the emitter body, which deforms in response to pressure variations within the water conduit.

3 Claims, 2 Drawing Sheets

DRIP IRRIGATION EMITTER EMBODIED IN A WATER CONDUIT PRESSURE COMPENSATING WITH SELF-REGULATION

BACKGROUND OF THE INVENTION

1. Field of the Invention

The present invention relates to an emitter which compensates water pressure for use in drip irrigation pipes. More particularly the invention relates to a one piece water regulating emitter embodied inside an under pressure conduit, which enables the water emission rate to be controlled permanently and independently of the pressure variations applied on the emitter, inside the conduit.

2. Background of the Invention

Drip irrigation is recognized as a superior system of water irrigation for various cultivations. The objective of the system is to irrigate a precise area of soil around a plant in order to:

a) Avoid compacting of soil
b) Minimize weed growth
c) Minimize water consumption
d) Minimize the energy and labor costs of irrigation For this reason there is a great need for drip irrigation systems that are highly economical in their construction, installation, operation, maintenance and storage.

One of the most important functions of the emitter is the compensation of various water pressures applied on the emitter, so that water is emitted at a constant rate of flow at the emission outlet points of the emitter and reaches the plant in a constant desired volume, as it is actually needed and where it is needed.

DRAWBACKS OF THE EXISTING DRIP IRRIGATION SYSTEMS TODAY

There are numerous systems of drip irrigation available. Not all of them give full satisfaction to the grower. Many of them are not suitable for use more than one season, since they clog quickly. Most importantly, the emission of water from the emitters is not uniform in volume, due to their inability to compensate the pressure variations of the water applied on the emitter. Thus, the plants receive different volume of water at different points, all along the linear sowed or planted lines. This fact results in non-equal plant growth.

SUMMARY OF THE INVENTION

The objectives of the present invention are the following:

1) To overcome today's existing difficulties and drawbacks by making available a flexible emitter with elastic properties, which can be embodied in the inside of a conduit and has the capability to compensate pressure variations with self-regulation. The emitter has part of its internal surface exposed to the water pressure existing inside the conduit, which exposed part is deformed each time by the applied pressure.

2) To provide an emitter of the type described above, which self-regulates to provide a constant water flow, independently of the topographical conditions or the pressure variations of the water applied on the emitter.

3) To provide an emitter of the type described above which can be used in irrigation conduits of a substantially greater length.

4) To provide an emitter made in such a way so that passage is formed between the outer sculptured wall of the emitter and the inner wall of the water conduit. This passage mainly consists of:

a) holes opened on the emitter for water entrance
b) the formed passage labyrinth which leads the water into the emitter
c) the flexible and elastic part (hereinafter "deformable part") of the labyrinth passage, which self-regulates to compensate water pressure variations inside the water conduit.

5) To provide an emitter on which a peripheral channel is placed in the middle of the emitter's length, where the water arrives after passing through the deformable self-regulating part (which controls the flow rate). The water exits the peripheral channel, through preopened holes on the conduit, exactly positioned on the point where the peripheral channel is placed. The water then passes out of the conduit to irrigate the soil.

6) To provide an emitter upon which the existing peripheral channel as described above is equipped with side rings, so that these rings protect the channel from compression on the inside wall of the water conduit.

7) To provide an emitter as described above, which, being symmetrical, does not require any special positioning inside the conduit, but can be positioned either by the front or back sides, since the water exit channel is located in the middle of the emitter's length.

8) To provide an emitter as described above, constructed completely from flexible material, having elastic properties, without creating problems and difficulties during assembling and which emitter is highly cost-effective.

DESCRIPTION OF THE PREFERRED EMBODIMENT

No attempt is made to show structural details of the invention in more detail than necessary. The aim of the description is that the invention becomes simply understandable and also so obvious, to those skilled in the art, that the description given with drawings, may indeed take several forms when realized.

Figure 5:
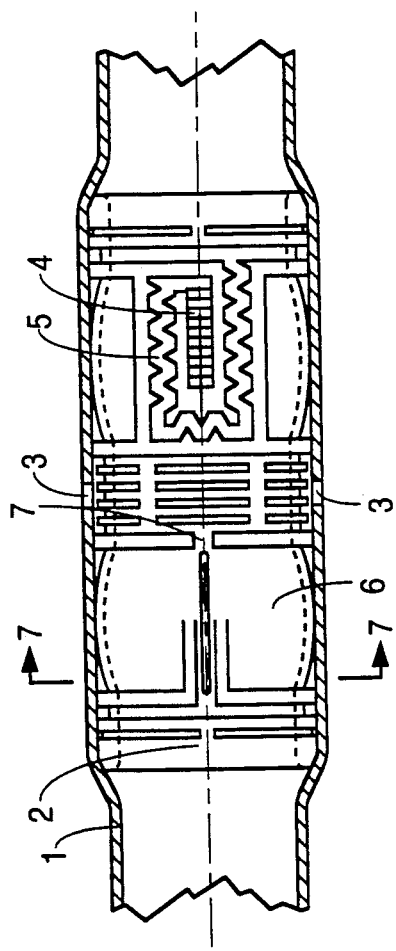
FIG. 5. A longitudinal section of a piece of an irrigation conduit showing a side view of the inserted emitter.
Figure 6:
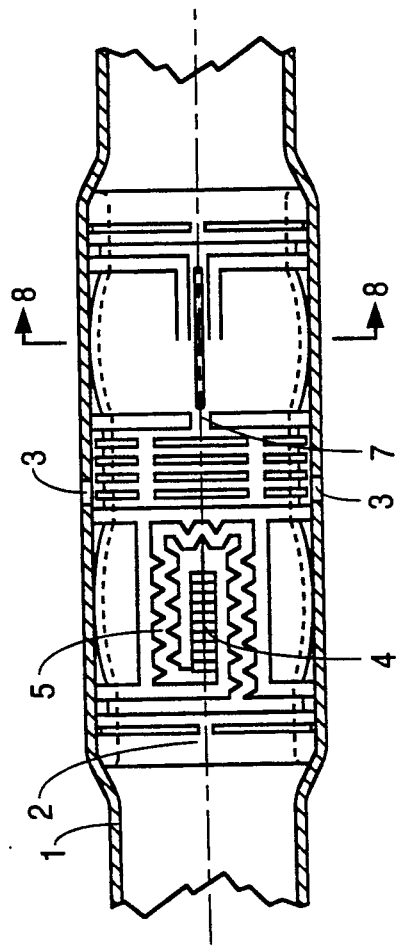
FIG. 6. A longitudinal section of a piece of an irrigation conduit showing a view of the emitter from the side opposite the view of FIG. 5.

Referring to the drawings herein as examples of reference, showing the characteristics of the same parts or corresponding with all the various views, referring particularly to FIGS. 5 and 6, it is obvious that the invention comprises one cylindrical emitter (2) which is firmly embodied inside a cylindrical water conduit (1) and which emitter (2) allows water to pass through grooved openings (4) from the conduit into the flow passage (5) through which and from which the water is guided to the deformable part (6) which part compensates automatically the water pressure. After passing the deformable parts, the water enters into the peripheral channel (7) and so it meets the exit holes (3) and flows out at an already regulated volume of water independently of the variations of pressure which might exist inside the conduit (1). The emitter is symmetrical in that the peripheral channel is located in the middle of the emitter, and water can enter the emitter from either side. That is, each side of the emitter comprises water inlets (4), flow passages (5), and deformable parts (6).

Reference is made also to FIGS. 5, 6, 7 and 8 where the flow passage (5) is shaped from the protuberances on the external peripheral surface of the emitter (2), which protuberances are glued together with the inside peripheral surface of the conduit (1) to form the flow passage.

Figure 1:
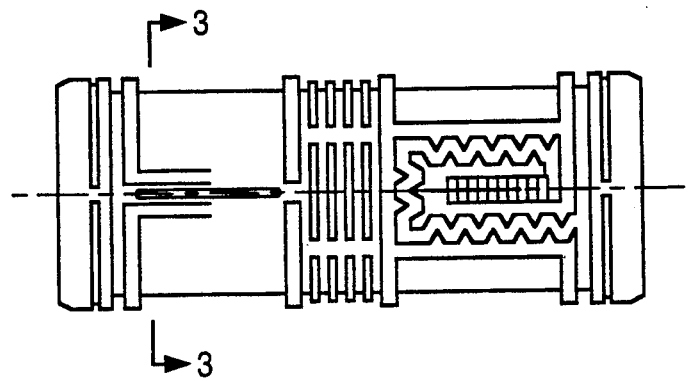
FIG. 1. A side view of the emitter as described in the present invention.
Figure 3:
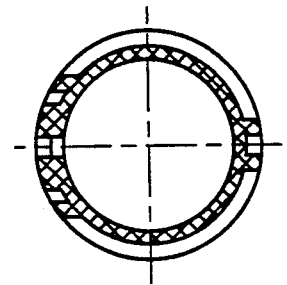
FIG. 3. A section on the line A—A' of FIG. 1.
Figure 2:
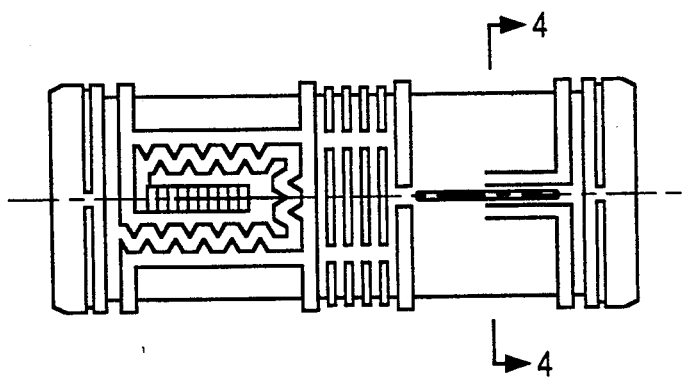
FIG. 2. A view of the emitter from the side opposite the view of FIG. 1 as described in the present invention.
Figure 4:
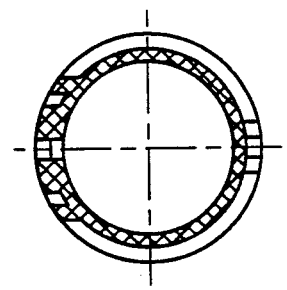
FIG. 4. A section on the line B—B' of FIG. 2.
Figure 7:
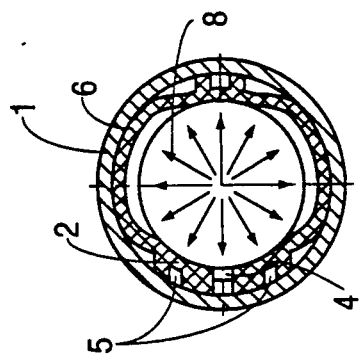
FIG. 7. A section on the line C—C' of FIG. 5 on which appears deformation of the emitter part when water is running inside the conduit under hydraulic pressure.
Figure 8:
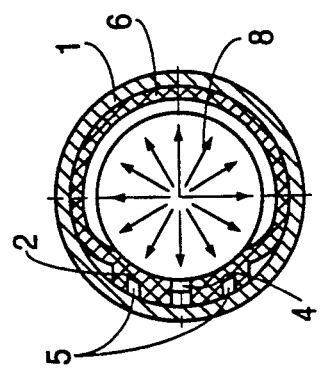
FIG. 8. A section on the line D—D' of FIG. 6 on which appears the deformation of the emitter when water is running in the conduit under hydraulic pressure.

Reference is made also to FIGS. 7 and 8 where the deformable part (6) of the emitter (2) is relatively deformed and compensates the water pressure, shown by arrows (8).

Reference is made to the peripheral channel (7) through which water is guided to exits (3) which exits (3) have been drilled on a zone of the conduit (1), which zone of the conduit (1) is positioned in the middle of the length of the emitter (2) so facilitating the coincidence of exits (3) and peripheral channel (7). In a preferred embodiment, the emitter has side rings that encircle the emitter on either side of the peripheral channel. These side rings provide support for the peripheral channel, preventing the pressure inside the water conduit from collapsing the channel against the inside wall of the conduit.

Reference is made to FIGS. 7 and 8 which show the emitter (2) made of flexible material with elastic properties.

During operation, the emitter which inside the conduit compensates the water pressure with self-regulation, operates according to the function of the invention as follows: Water flowing inside the conduit (1) arrives at emitter inlet openings, (4) enters inside the emitter (2), and is guided through passage (5) where its volume is reduced due to the size and length of the passage and due to the caused frictions and stirrings of water passing through the path having the form of a labyrinth. After this travel, the water enters the deformable part (6) of the emitter where the wall of this part (6) is variably deformed according to the existing pressure of water inside the conduit (1) and said part (6) automatically reduces the flow of water accordingly. At this moment, the compensation of water pressure inside the conduit (1) is effected and all emitters positioned inside and embodied in the conduit have the same emission of water volume per hour of irrigation, independently of the variations of the water pressure, which is applied in the water conduit all along its length.

I claim:

1. A drip irrigation system, comprising a water conduit (1) and a series of cylindrical, one-piece, pressure compensating emitters (2), inserted in said water conduit (1), wherein each emitter (2) has a body comprised of a flexible elastic material and having inlet means (4) in communication with the interior of the water conduit (1), said inlet means (4) in communication with a labyrinth-like flow passage (5) defined between the outer periphery of the emitter body and the interior wall of said conduit (1), said flow passage passing through a deformable part (6) of the emitter body and opening into a peripheral channel (7) communicating with an exit hole in the wall of the water conduit (1), said deformable part (6) of the emitter body being deformed in response to the water pressure within the water conduit (1) and coacting with the inner surface of the water conduit, thereby maintaining the water flow through the passage (5) on a constant level independently of the water pressure variation within the water conduit, characterized in that each emitter (2) is symmetrical having the peripheral channel (7) placed in the middle of the length of the emitter body with an inlet means (4), a flow passage (5) and a deformable part (6) located on each side of said channel (7).

2. A drip irrigation system according to claim 1, characterized in that said peripheral channel (7) is equipped with side rings to protect the peripheral channel (7) from being compressed to the inside wall of the water conduit (1).

3. A cylindrical one-piece pressure compensating emitter for inserting in a water conduit of a drip irrigation system, wherein the emitter (2) has a body comprised of a flexible elastic material and having inlet means (4) in communication with the interior of the water conduit (1), said inlet means (4) communicating with a labyrinth-like flow passage (5) defined between the outer periphery of the emitter body and the interior wall of said conduit (1), said flow passage passing through a deformable part (6) of the emitter body and opening into a peripheral channel (7) communicating with an exit hole in the wall of the water conduit (1), said deformable part (6) of the emitter body being deformed in response to the water pressure within the water conduit (1) and coating with the inner surface of the water conduit, thereby maintaining the water flow through the passage (5) on a constant level independently of the water pressure variation within the water conduit, characterized in that the emitter (2) is symmetrical having the peripheral channel (7) placed in the middle of the length of the emitter body with an inlet means (4), a flow passage (5) and a deformable part (6) located on each side of said channel (7).

* * * * *

UNITED STATES PATENT AND TRADEMARK OFFICE
CERTIFICATE OF CORRECTION

PATENT NO. : 5,330,107
DATED : July 19, 1994
INVENTOR(S) : George Karathanos

It is certified that error appears in the above-indentified patent and that said Letters Patent is hereby corrected as shown below:

```
Column 2, line 38:   "A-A'" should be "3-3"

Column 2, line 39:   "B-B'" should be "4-4"

Column 2, line 45:   "C-C'" should be "7-7"

Column 2, line 49:   "D-D'" should be "8-8"

Column 4, line 47:   "coating" should be "coacting"
```

Signed and Sealed this

Twenty-ninth Day of November, 1994

Attest:

BRUCE LEHMAN

Attesting Officer    Commissioner of Patents and Trademarks